O. ANDERSON.
DRAFT GEAR.
APPLICATION FILED AUG. 5, 1915.
1,175,580.
Patented Mar. 14, 1916.
2 SHEETS—SHEET 1.
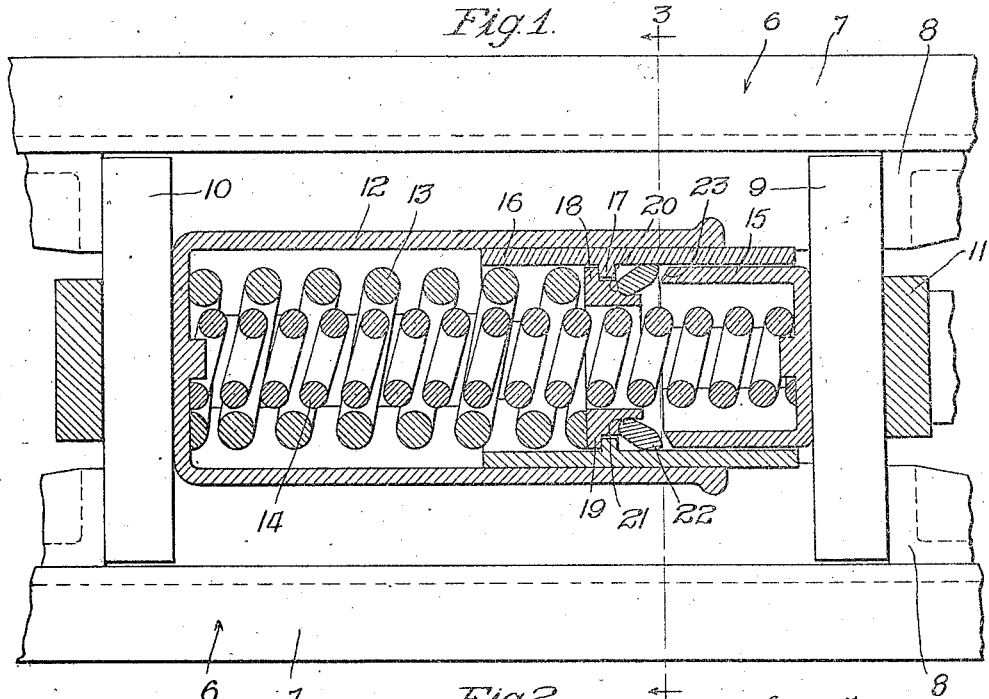
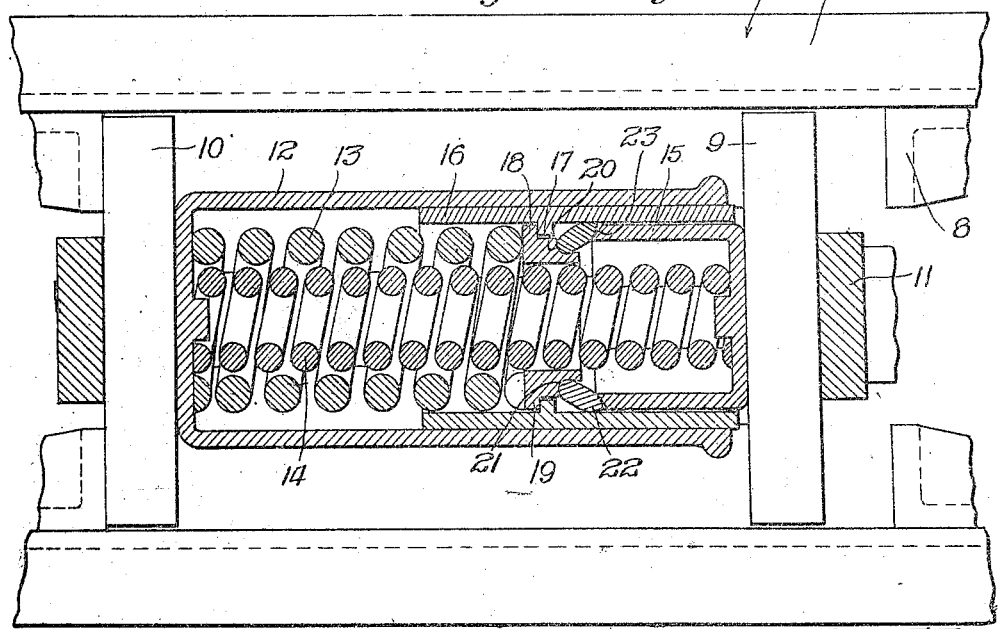
Witness:
G. C. Higham
Ephraim Banning
Inventor
Olof Anderson
by Banning & Banning
Attys.

O. ANDERSON
DRAFT GEAR.
APPLICATION FILED AUG. 5, 1915.

1,175,580.

Patented Mar. 14, 1916.
2 SHEETS—SHEET 2.

Witness:
Y. C. Higham
Ephraim Banning

Inventor
Olof Anderson
by Banning & Banning
Attys.

UNITED STATES PATENT OFFICE.

OLOF ANDERSON, OF CHICAGO, ILLINOIS, ASSIGNOR, BY MESNE ASSIGNMENTS, TO A. H. FLINT, OF NEW YORK, N. Y.

DRAFT-GEAR.

1,175,580.  Specification of Letters Patent.  Patented Mar. 14, 1916.

Application filed August 5, 1915.  Serial No. 43,755.

*To all whom it may concern:*

Be it known that I, OLOF ANDERSON, a citizen of the United States, residing at Chicago, in the county of Cook and State of Illinois, have invented certain new and useful Improvements in Draft-Gears, of which the following is a specification.

The present invention relates to an appliance adapted for use with traveling conveyances for the purpose of absorbing shock transmitted to the conveyance during the use thereof, and is particularly adapted for use in connection with railway cars for absorbing the shock and strain incident to the coupling of cars and the pull exerted in starting the cars in motion.

The objects of the invention are: to provide a gear which will be so formed as to take care of the lesser of the shocks or strains, by means of an initial shock absorbing part, and which, upon further strain or shock being communicated, will bring into action a secondary shock absorbing mechanism; to create both a frictional and spring resistance for the purpose of shock absorption; and to provide means whereby the friction devices are immediately released from frictional engagement when the strain upon the gear ceases, thereby preventing any sticking or locking of the gear, which would render it ineffective as a shock absorbing medium, and is, therefore, highly undesirable.

Figure 3:
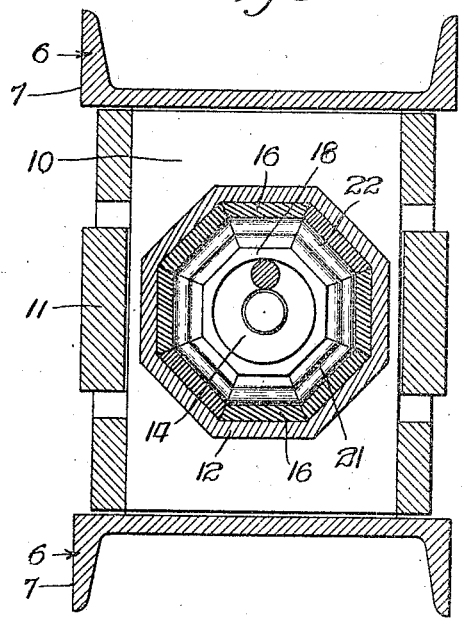
Figure 4:
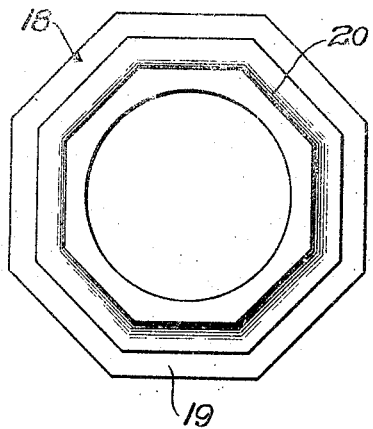
Figure 5:
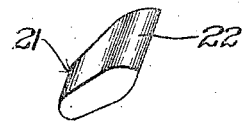

In the drawings: Figure 1 is a longitudinal section of the gear of the present invention, showing the parts in normal position; Fig. 2 is a view similar to Fig. 1, showing the position assumed by the parts when a shock or strain is communicated to the gear.; Fig. 3 is a section on line 3—3 of Fig. 1, looking in the direction of the arrows; Fig. 4 is a face view of the ring which carries the friction blocks; and Fig. 5 is a perspective of one of the friction blocks.

As is well known in the art to which the present invention relates, a great deal of wear and tear upon railway cars is brought about by the impact, due to the coupling thereof, and likewise from the strain and pull exerted in starting the train. The present invention deals with a combined friction and spring mechanism for absorbing these shocks and strains and preventing their communication to the car body.

One of the principal features that must be present in all draft gearing where friction is used is the quick release of the friction devices when the strain is relieved from the gear. If this is not brought about, these friction devices will jam or lock, and thus when the gear receives its next impact it will be in a locked condition, and the give which is essential to absorb the shock will not be present. The gear is then utterly ineffective to accomplish its work, and damage to the car results.

Referring now to the drawings, and particularly to Figs. 1, 2, and 3, the device is illustrated in connection with a portion of the usual car underframing 6 of any well known construction, which embodies the angle plates 7 and the usual stop members 8 secured thereto; and traveling between these stop members are the usual forward follower plate 9 and rear follower plate 10. A yoke 11, also of any well known and desirable construction, extends around these follower plates. The gearing itself comprises an outer shell or casing 12, which is preferably polygonal in formation, and, as shown, is of eight-sided formation, although this particular shape is not to be deemed a limitation on the invention. Within this casing is an outer coil spring 13 and an inner coil spring 14, the spring 13 being of a greater tensional strength than the spring 14; and the spring 14, as will be seen from the drawings, extends beyond the spring 13 and is interposed between the inner face of a cup-shaped member 15 and the inner face of the rear wall of the casing, this cup-shaped member lying at the outer end of the gear mechanism, and may, therefore, be termed an outer cup-shaped member. This cup-shaped member has its outer face resting against the forward follower 9, and when a light shock is transmitted to the gear the cup-shaped member 15 is forced inward compressing the spring 14 for the absorption of such light shock, and the friction devices and spring 13 of major tension are not brought into action, except when shocks of greater force are transmitted to the gear. The friction devices comprise a series of plates 16, and, as shown, are eight in number, each of which rests against the inner face of one of the panels of the casing 12. Each plate 16 is provided midway of its length with an inwardly extending flange 17. As will be understood from the drawings, the cup-shaped member 15 slides within these plates 16. Thus the plates are in telescoping relation to the casing and the cup-shaped member in telescoping relation to the plates. A central ring member 18 is also provided, which is formed with an outwardly extending flange 19 located at its rear end, which flange engages the flange 17 to center the parts with respect to one another when they return to normal position; and this ring is formed with a series of seats 20, each of a shape and size to receive one end of a friction block 21. These friction blocks are formed with one rounded end, which engages with the seat 20 and are formed with a tapered or wedge-like outer or acting end 22. The faces of this wedge end, however, are, as shown, slightly curvilinear in nature, and there is one friction block for each of the plates 16. Interposed between the rear face of this ring 18 and the inner face of the rear wall of the casing 12 is the spring 13, which, as previously stated, is of the greater tension strength. The forward edge of the cup-shaped member is of a sloping nature, as indicated by the numeral 23, and when sufficient shock or strain is transmitted to the gearing this tapered face comes into engagement with one of the faces of the acting end 22 of the friction blocks 21, swinging these blocks outward and into engagement with the plates 16, forcing these plates outward and into engagement with the sides of the casing.

By forcing the plates 18 outward and into engagement with the inner face of the casing in the manner previously described, it is obvious that, upon further strain being placed upon the gear, inward or telescoping movements of the plates with respect to the casing will be attendant by a frictional resistance due to the engagement of the plates with the inner face of the casing. After the plates 16 have been brought into engagement with the inner sides of the casing, then, upon further inward movement of the movable parts of the gearing, the outer cup-shaped member 15, the plates 16, the ring 18, and the friction blocks 21 all move in unison. The inner spring 14 is compressed between the rear wall of the casing and the inner wall of the cup-shaped member, and the outer spring 13 is compressed between the inner rear wall of the casing and the rear face of the ring 18. Thus, upon such inward movement, there is a combined spring and frictional resistance which acts to absorb the shock and prevent transmission of the same to the frame of the car. When a pull or strain is exerted upon the gearing, the strap is moved in a forward direction, forcing outwardly the rear follower 10 which moves the casing 12 outwardly, bringing the friction blocks into engagement with the tapered end of the forward cup-shaped member, forcing the acting end of these blocks outward, and spreading the plates 16 to bring them into engagement with the inner face of the casing, the springs 13 and 14 being both compressed by such movement. Thus, in case of a strain or pull, there is a combined frictional and spring resistance created, preventing transmission of the strain to the frame of the car.

One of the principal features of the present invention lies in the quick and instantaneous release of the friction devices when strain upon the gearing ceases. Assume that a shock has been transmitted to the gearing, moving the parts into the position shown in Fig. 2; when the strain of this shock ceases, the spring 14 will instantaneously act to move the cup-shaped member away from the friction blocks. These blocks will drop away from the plates 16, allowing these plates to collapse and pass from engagement with the inner wall of the casing. Thus, all frictional resistance will cease and all parts of the gear will move back to normal position with a free and unimpeded movement. This prevents any locking of the gear, due to the failure of the release of the friction devices, which locking, as heretofore stated, renders the gear useless for shock absorption, and thus, although in the present invention a frictional resistance is created when sufficient strain is imparted to the gear, such friction resistance ceases practically instantaneously with the release of the strain, and the gear can return to normal position.

It is to be noted that the forward cup-shaped member, at all periods of the operation, has a free movement within the casing of the gear, and there is no danger of this member ever becoming bound or locked; and since this member controls the operation of the friction devices, it follows that an accurate and desired movement of these devices will always be attended upon the operation of the gear.

Although the invention has been described as a draft gear for railway cars, the adoption of it as a shock absorber for automobiles is contemplated without departing from the spirit of the invention, provided, of course, the structure is maintained within the scope of the appended claims.

I claim:

1. In a draft gearing, the combination of a casing, a series of independently movable plates within the casing, adjacent to the inner wall thereof, a series of blocks, one block for each plate, a carrier for said blocks, a member arranged in advance of said blocks and adapted to control the in and out movements of said blocks with respect to the plates, said member having at all times a free movement with respect to said blocks and plates, an inner spring interposed between the inner wall of the casing and said block controlling member, and an outer spring interposed between the inner wall of the casing and the carrier for said blocks, substantially as described.

2. In a draft gearing, the combination of a casing, a series of independently movable plates within the casing, adjacent to the inner wall thereof, a series of blocks, one block for each plate, a carrier for said blocks, a member arranged in advance of said blocks and adapted to control the in and out movements of said blocks with respect to the plates, said member having at all times a free movement with respect to said blocks and plates, an inner spring interposed between the inner wall of the casing and said block controlling member, and an outer spring interposed between the inner wall of the casing and the carrier for said blocks, and said block controlling member being normally spaced away from said blocks whereby said controlling member and inner spring act to absorb the lighter shocks, substantially as described.

3. A draft gearing comprising a casing, a series of independently movable plates arranged within the casing, adjacent the inner wall thereof, a series of blocks, one for each plate arranged to move the plates in and out with respect to the inner wall of the casing, a carrier for said blocks, a cup-shaped member arranged in advance of said block and adapted to control the movement of the block in and out with respect to said plates, and means for creating a tension resistance against the movement of said cup-shaped member, and said cup-shaped member having at all times a free movement with respect to said block and plates, substantially as described.

4. In a draft gearing, the combination of a casing, a series of independently movable plates arranged within the casing, adjacent the inner wall thereof, a series of blocks, one for each plate, a ring-like member carrying said blocks, a cup-shaped member arranged in advance of said blocks and adapted to control the movement of said blocks in and out with respect to the plates, a spring interposed between the inner rear wall of the casing and the ring, and a spring interposed between the inner rear wall of the casing and the cup-shaped member, said cup-shaped member having at all times a free movement with respect to said plates and block, substantially as described.

5. In a draft gearing, the combination of a casing, a series of independently movable plates arranged within the casing, adjacent the inner wall thereof, a series of blocks, one for each plate, a ring-like member carrying said blocks, a cup-shaped member arranged in advance of said blocks and adapted to control the movement of said blocks in and out with respect to the plates, a spring interposed between the inner rear wall of the casing and the ring, and a spring interposed between the inner rear wall of the casing and the cup-shaped member, said cup-shaped member having at all times a free movement with respect to said plates and block, and said cup-shaped member being normally spaced away from said blocks whereby said member and spring associated therewith acts to absorb the lighter shocks, substantially as described.

6. In a draft gearing, the combination of a casing, a series of independently movable plates arranged within the casing, adjacent the inner wall thereof, a series of blocks, one for each plate, a ring-like member carrying said blocks, a cup-shaped member arranged in advance of said blocks and adapted to control the movement of said blocks in and out with respect to the plates, a spring interposed between the inner rear wall of the casing and the ring, a spring interposed between the inner rear wall of the casing and the cup-shaped member, said cup-shaped member having at all times a free movement with respect to said plates and block, and flanges upon said plates and ring adapted to coöperate to center the parts with respect to each other, substantially as described.

7. In a draft gear, the combination of a casing, a series of independently movable friction plates arranged within the casing and adjacent the inner wall thereof, a series of radially arranged blocks adapted to control the movement of the plates to and from the walls of the casing, a carrier for said blocks on which said blocks are independently movable, a forward follower lying beyond the casing, said plates extending normally beyond the casing and adjacent to said follower, a member for moving said blocks, said member resting against said follower and in telescopic relation to said plates, and tension means for offering resistance to the inward movement of the movable parts of the gear, substantially as described.

OLOF ANDERSON.

Witnesses:
 Wm. P. Bond,
 William Smith.